United States Patent [19]
Griffin et al.

[11] Patent Number: 5,747,773
[45] Date of Patent: May 5, 1998

[54] ARC WELDER POWER SOURCE

[75] Inventors: David C. Griffin; Dale T. Wiersema; Richard A. Eldridge; William R. Klingbeil, all of Florence, S.C.

[73] Assignee: The ESAB Group, Inc., Florence, S.C.

[21] Appl. No.: 573,927

[22] Filed: Dec. 18, 1995

[51] Int. Cl.$^6$ ..................................................... B23K 9/10
[52] U.S. Cl. ..................... 219/130.1; 361/328; 361/695
[58] Field of Search ........................... 219/130.1, 137 PS; 361/328, 329, 330, 695; 415/119, 213.1

[56] References Cited

U.S. PATENT DOCUMENTS

| | | | |
|---|---|---|---|
| 3,790,860 | 2/1974 | Verdisco | 361/213.1 |
| 5,186,605 | 2/1993 | Tracy | 415/213.1 |
| 5,208,730 | 5/1993 | Tracy | 415/213.1 |
| 5,406,050 | 4/1995 | Macomber et al. | 219/130.1 |

OTHER PUBLICATIONS

Instruction Manual for L-TEC 650cv Welding Power Supply (Form No. F-14-250-A) dated Apr., 1989 and published by L-TEC Welding & Cutting Systems, Florence, SC.
Instruction Manual for L-TEC 650cvcc Welding Power Source (Form No. F-15-100-A) dated Dec., 1993 and published by L-TEC Welding & Cutting Systems, Florence, SC.
Owner's Manual for Dimension™ 302 and 452 (Form No. OM-277) dated Dec. 1994 and published by Miller Electric Mfg. Co., Appleton, WI.

*Primary Examiner*—Clifford C. Shaw
*Attorney, Agent, or Firm*—Bell Seltzer Intellectual Property Law Group of Alston & Bird, LLP

[57] ABSTRACT

A power source apparatus for supplying electrical power for an arc welder includes a frame having a base member and first and second pairs of support members each defining an inverted V-shaped configuration mounted to the opposite side edges of the base member. An inverted channel cross member extends transversely between the upper ends of the support members. The support members each define a U-shaped channel having a pair of sidewalls and a connecting wall therebetween and are oriented such that the connecting walls face away from each other. An associated assembly method includes the steps of adjoining the ends of first and second pairs of support members and connecting them with a cross member to define a frame subassembly. At least a portion of the power circuit of the arc welder power source is then mounted on the frame subassembly before it is attached to the power source frame. A busbar assembly for supporting two rows of capacitors in parallel on the frame of an arc welder is also provided. A fan assembly for generating an airstream through the power source is also provided and includes a frame mounted to the power source defining at least two opposed recessed portions.

41 Claims, 5 Drawing Sheets

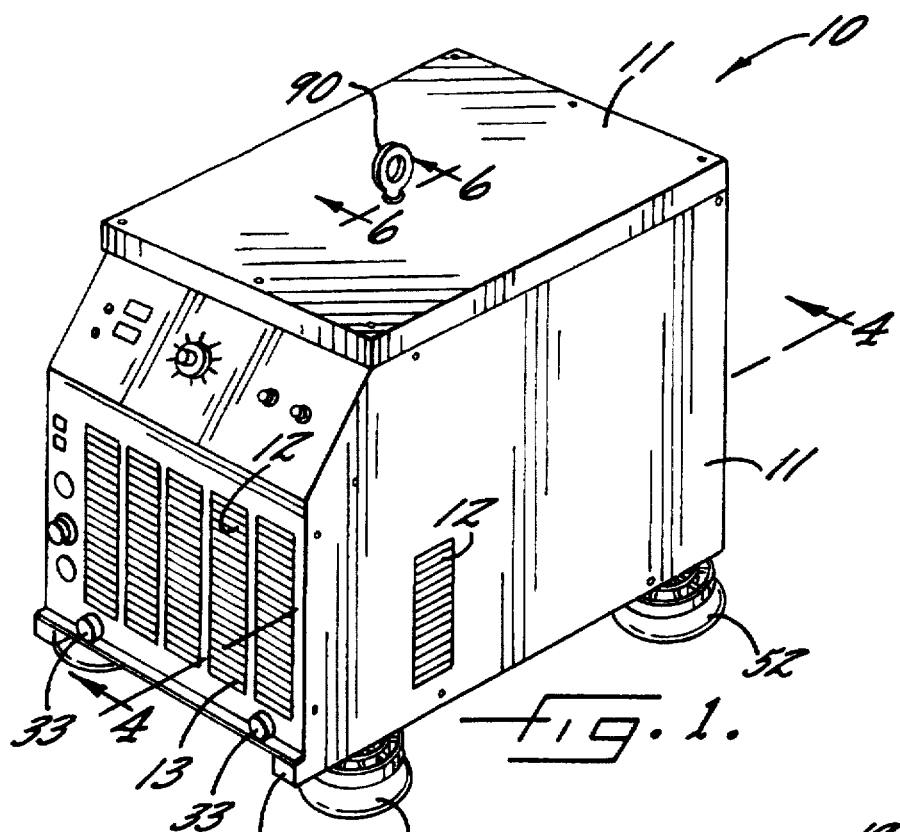
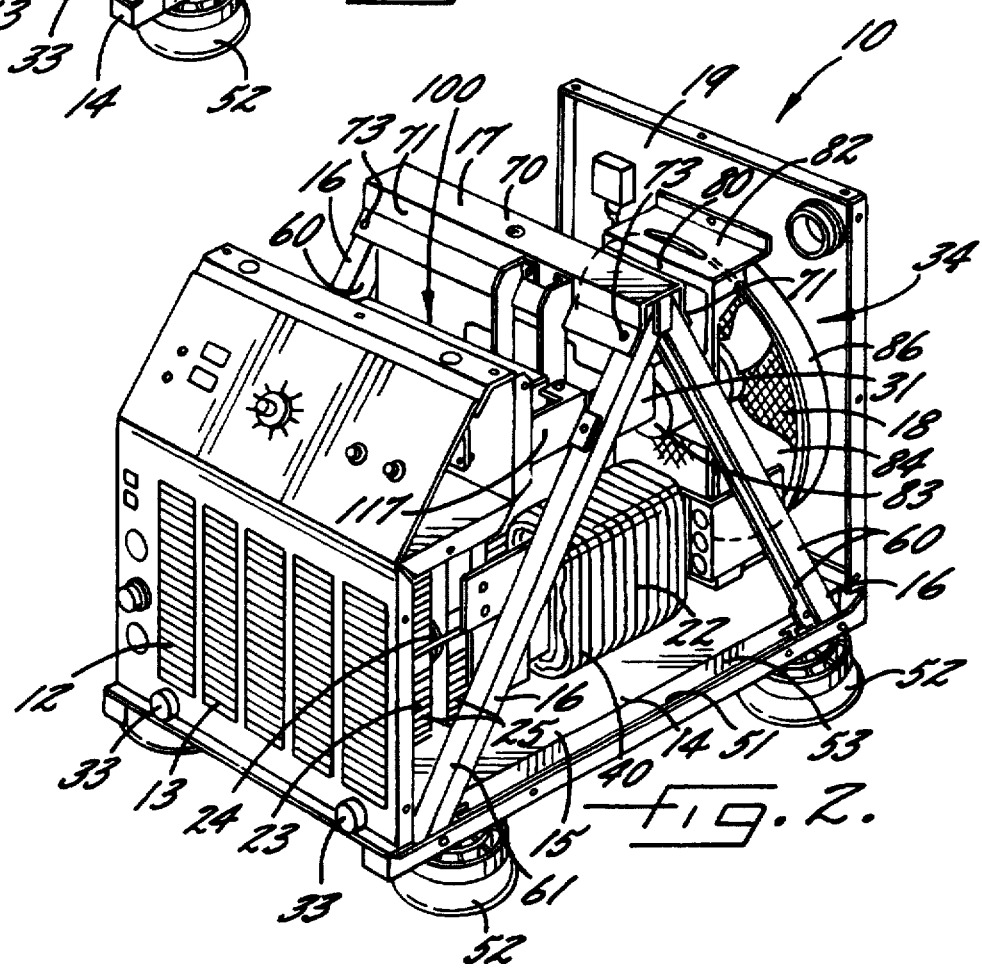

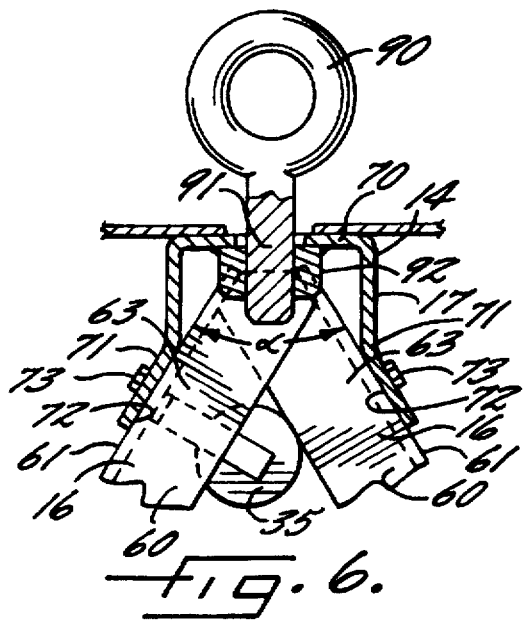
fig. 6.
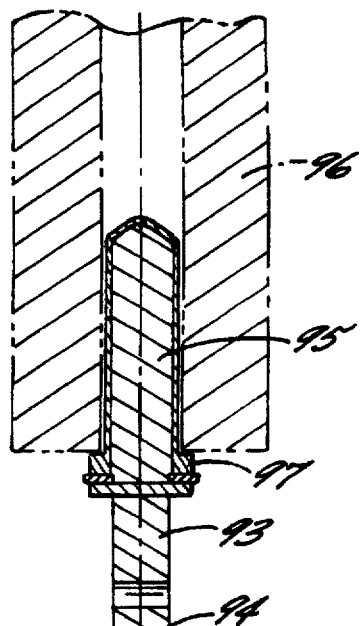
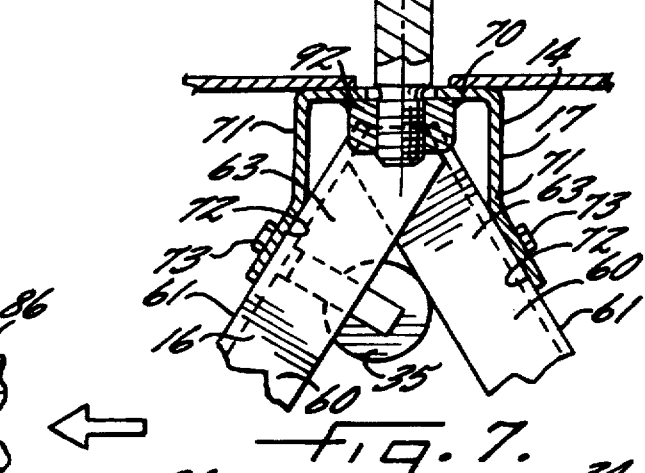
fig. 7.
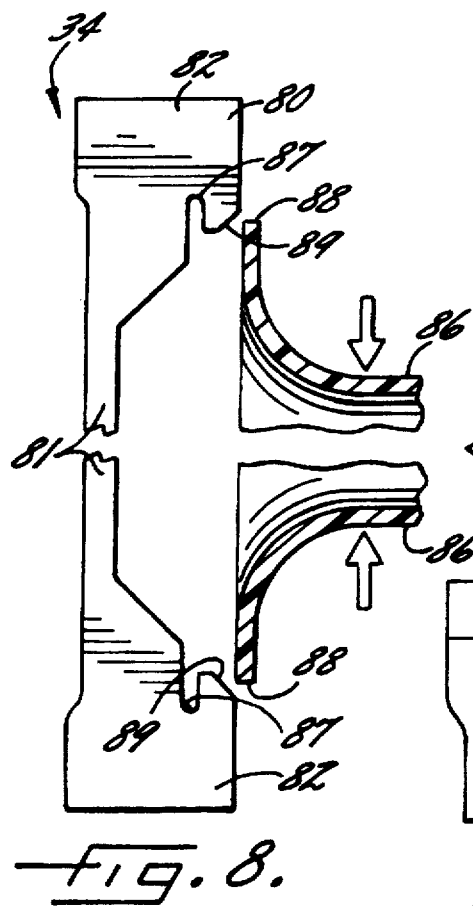
fig. 8.
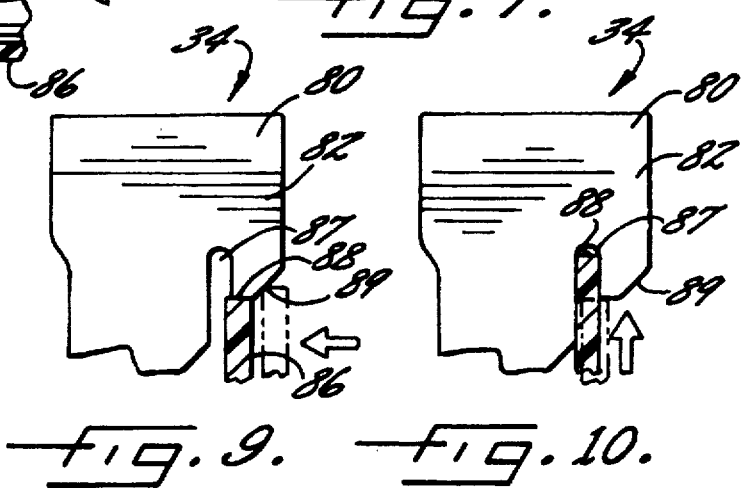
fig. 9.   fig. 10.

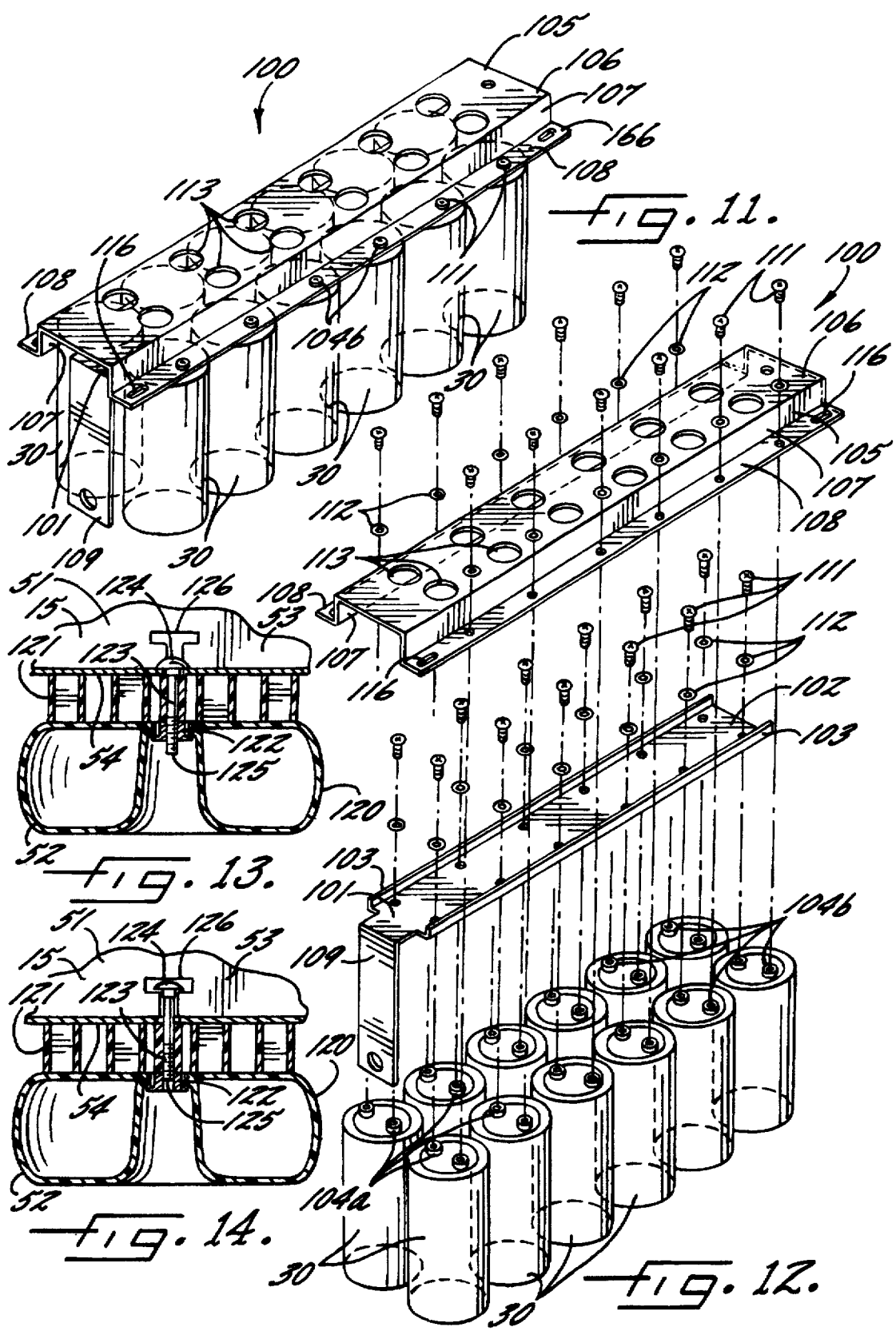

5,747,773

ARC WELDER POWER SOURCE

FIELD OF THE INVENTION

The present invention relates to arc welders, and more particularly relates to power source apparatus for arc welders.

BACKGROUND OF THE INVENTION

Electric arc welders are used for joining metal workpieces and can be generally categorized into three basic types: manual "stick electrode" arc welders, MIG welders and TIG welders. With conventional stick electrode arc welding, a consumable coated rod or stick of metal is placed adjacent to the workpieces being welded and an arc is generated between the electrode and the workpiece to form a weld bead and join the workpieces together. The heat of the arc transfers filler metal from the electrode to the workpiece and the weld bead is formed. After the electrode has been used to its fullest, it must be replaced with a new electrode. Similarly, with MIG (Metal-Inert Gas) welding, a consumable metal wire comprises the filler and is continually fed to the arc. In addition, an inert or slightly oxidizing gas is supplied to shield the arc from the atmosphere and improve the metallurgical qualities of the weld. TIG (Tungsten-Inert Gas) welding uses a non-consumable tungsten electrode. Filler material may be supplied by way of an adjacent consumable rod.

Arc welders include a power source electrically connected to the workpiece for generating the desired arc. The power source includes an input line which is connected to a conventional supply of electric power, such as household or industrial alternating current. The power source also includes two terminals at the output side. One of the terminals is connected to the welding torch (or electrode holder) for providing the arc to the workpiece when positioned adjacent thereto. The other terminal is connected to the workpiece to complete a circuit with the power source.

The power source typically includes a frame with the various electrical components necessary for creating the electric arc supported on the frame. One or more cover panels are attached to the frame and shield the electrical components from the operator.

One of the electrical components of the power source is a transformer having a primary side and a secondary side. The input line is connected to the primary side of the transformer for supplying the current. The current supplied to the primary side is then transformed from a high voltage-low amperage signal on the primary side of the transformer to a low voltage-high amperage signal on the secondary side. From the transformer, the current is passed to a rectifier to convert the alternating current to a direct current. The current is then preferably passed through one or more inductors and capacitors to smooth out any voltage deviations before the current is directed to the output line and the electrode connected thereto.

The various electrical components of the power source, and particularly the components of the rectifier, can generate large amounts of heat. Accordingly, many conventional welders are provided with a cooling fan to generate an airstream through the power source and over the various components. These cooling fans typically include an electric motor driven fan mounted to the frame adjacent to the back of the power source. Air is drawn in through various vents formed in the cover panels and exhausted through vents in other cover panels.

Accordingly, to enhance the cooling efficiency of the fan, it is advantageous to maximize the exposure of the electrical components to the airstream. One way of enhancing the cooling is to orient the electrical components relative to the direction of the airstream such that convective heat transfer from the components is maximized. In particular, with regard to electrical components having windings such as transformers and inductors, it is desirable to orient the windings such that the axis defined by the windings is parallel to the direction of the airstream.

Conventional power supplies are limited in terms of the available orientations of the electrical components and the air flow which may be passed thereover by the frame design. Accordingly, there is a need for an arc welder power source frame which provides improved component mounting and orientation and convective heat transfer.

One preferred arc welder is known as the L-TEC 650CV formerly manufactured by L-TEC Welding & Cutting Systems. The L-TEC arc welder includes a base member and front and rear cover panels. A fan is mounted to the rear panel on a fan frame subassembly and a fan shroud is fastened to the fan frame subassembly. A transformer assembly is mounted to the base member midway between the panels wherein the windings are arranged with the central axes thereof extending vertically. A lift hook for lifting the power source by way of a crane, etc. is mounted on top of the transformer assembly. An inductor assembly is mounted to the base member between the rear panel and transformer assembly with the windings extending horizontally in a direction transverse to the front and rear panels. Although this type of arc welder has been exemplary, it is desirable to enhance the orientation of the electrical components and the cooling capacity of the fan. It is also desirable to decrease the costs of assembling the fan and fan shroud.

Another commercially available arc welder is sold under the name Dimension™ 302 and 452 by Miller Electric Mfg. Co. The Miller arc welder is believed to be described in a document entitled "Owner's Manual" bearing a date of December, 1994 and a Form No. OM-277. In particular, page 32 of the document includes an illustration entitled "Figure 8-1. Main Assembly (452 Model Illustrated)."

The illustration is an exploded view of the main components of the power source of the Miller arc welder and includes a base and four upright channels attached to the base. The upright channels are arranged in pairs with the top edges of each pair generally adjacent each other so as to define a pair of A-frame structures on the base. The illustration also shows a lift eye mounted between a pair of mounting bars which are in turn secured between the upper ends of the upright channels.

The upright channels are substantially C-shaped in cross section and include sidewalls and a base wall therebetween. Portions of the sidewalls of the C-shaped channels adjacent the upper ends thereof are cut away and the portions of the base walls extending beyond the cutaway portions are turned upwardly so as to each lie in a vertical plane. The upturned base wall of one upright channel is separated from the upturned base wall of the other upright channel of that pair and the mounting bars are fitted in the space between the separated base walls and are secured thereto. The cutting and bending operations entail significant manufacturing and assembly costs, however, and it is desirable to simplify the construction of a power source frame.

The illustration further shows a transformer connected to the sidewalls of the upright channels of the opposed A-frame structures and a stabilizer, which is believed to be an inductive device, mounted to the sidewalls of the upright channels above the transformer. Other components, such as a rectifier, are also mounted to the sidewalls of the upright channels. Mounting components on the sidewalls of the upright channels, however, requires special bracketing and complicated assembly and servicing procedures because the fasteners used are essentially behind and underneath the mounted components.

The illustrated cooling fan assembly includes a transversely mounted frame attached to the rear panel of the frame and an enclosure fastened to the rear of the frame for enclosing the fan blade. As discussed above, it is also desirable to decrease the manufacturing costs of the fan assembly.

FIG. 8-1 of the document also illustrates a conventional capacitor assembly including six capacitors arranged in a row. A busbar assembly is provided for electrically connecting the capacitors and includes two strips of conductive material wherein all the terminals of one polarity of the capacitors are aligned in a row and connected to one of the conductive strips. All the terminals of the opposite polarity are aligned in a single row and connected to the other conductive strip.

It is desirable, however, to mount the capacitors in more than one row in instances when more capacitors are desired or when a more compact frame design requires a shorter capacitor assembly. In addition, the Miller arc welder includes two capacitor mounting brackets which mount the central portion of the capacitor assembly to the lift eye mounting bar. It is advantageous for a capacitor assembly, however, to be mounted from its opposed ends on the frame support members which requires a structurally strong busbar assembly capable of supporting the weight of the capacitors.

It is desirable in certain instances to provide auxiliary welding apparatus for use in conjunction with an arc welder power source. For example, when MIG welding, the consumable wire must be continuously fed to the weld arc. This is typically accomplished by placing a wire feeder on the top cover panel of the power source. Other auxiliary welding apparatus include a boom which suspends the welding electrode and/or the consumable wire at a distance from the power source so that a large work area can be covered by the operator. These booms are typically also supported on the top cover panel of the power source.

These auxiliary welding apparatus are often mounted or supported on the top cover panel in a position adjacent to the central lift hook so that the power source can be lifted from the lift hook when the auxiliary apparatus is in place. The lift hook is positioned generally directly above the center of gravity of the power source so that, when lifted without any auxiliary welding apparatus supported thereon, the top cover panel remains generally horizontal. As would be understood, however, the auxiliary welding apparatus may cause the power source to tilt in one direction when lifted, which could cause the auxiliary welding apparatus to fall off the power source. Thus, if not handled properly, the arc welder could cause injury when lifted by the hook if the auxiliary welding apparatus is not first removed.

Accordingly, there is a need for an arc welder power source which solves the various problems associated with the conventional arc welder power source apparatus. For example, there is a need for an arc welder power source wherein the orientation of the various electrical components is improved for enhanced convective heat transfer to the airstream, and in particular there is a need for a power source frame which provides such an orientation. Moreover, a power source frame which provides such an orientation should be easy to assemble and disassemble for manufacturing and service. In addition, there is a need for an improved capacitor busbar assembly which allows the connection of more than one row of capacitors and which can be mounted from its ends on the power source frame. There is also a need for a fan assembly for a power source which decreases the amount of fasteners and assembly required to mount the fan assembly. Finally, there is a need for an arc welder power source upon which auxiliary welding apparatus can be supported without the possibility of the apparatus falling off when the power source is lifted by the lift hook.

SUMMARY OF THE INVENTION

The above needs are met and other advantages are accomplished by the provision of a power source apparatus according to the embodiments of the present invention. In particular, a power source apparatus for an arc welder or the like is provided including a frame having a generally rectangular base member defining front and rear edges and opposite side edges. Mounted on the base member is a first pair of support members each having a lower end and an upper end. The lower ends are mounted adjacent to one of the side edges of the base member in a spaced apart relation and the upper ends are positioned adjacent to each other so as to define an inverted V-shaped configuration. A second pair of support members having a configuration similar to that of the first pair is mounted adjacent to the other of the side edges of the base member. A cross member extends transversely between the respective upper ends of the first and second pairs of support members and is connected thereto so as to form a substantially rigid frame structure supported on the base member and on which various electrical components can be advantageously mounted.

The cross member is an inverted channel which defines an upper wall and a pair of depending side walls which are secured to the respective upper ends of each of the support members. In particular, the support members comprise a U-shaped channel defining a pair of side walls and a connecting wall therebetween. Advantageously, the connecting walls of each pair of support members face away from each other and thus provide a desirable mounting surface which is easily accessible for mounting various electrical and other components thereon.

The depending side walls of the cross member preferably include fastening surfaces which define an included angle corresponding to that defined by the inverted V-shaped support members. Accordingly, the support members may be advantageously joined to the cross member by a fastener, such as a bolt, which extends through the fastening surfaces of the cross member and the connecting wall of the support members. The included angle is preferably greater than 50°, and is more preferably about 60°.

The power source apparatus also includes a power circuit supported on the frame for generating the desired electric arc. The power circuit includes an electrical input line and a transformer having a primary side connected to the input line. A secondary side of the transformer is connected to a rectifier and an output line is connected to the rectifier. A cooling fan is mounted adjacent to one of the front and rear edges of the base member for generating an airstream through the apparatus which is directed in a generally horizontal direction.

The transformer and an inductor for smoothing the output voltage each include at least one set of windings which define a central axis. The transformer and inductor are mounted to the frame such that the central axes thereof are horizontally disposed and extend parallel to the direction of the airstream generated by the cooling fan. The transformer is mounted to the support members of the frame and the inductor is mounted to the cross member of the frame above the transformer. This configuration improves air flow and cooling of the power source.

The windings of the transformer and inductor may include a plurality of openings so as to permit a portion of the airstream generated by the cooling fan to flow therethrough. Advantageously, the openings in the transformer and inductor are maintained by a spacer disposed within each of the openings. The spacer is a C-shaped channel section formed of a heat conductive metal which further enhances the convective heat transfer to the airstream through the openings.

The base member of the frame may also include an upturned portion integrally formed with the front edge of the base member. This upturned portion is advantageous for securely mounting various switches or terminals to the base member. In addition, the base member further includes a pair of integrally formed U-shaped channels positioned adjacent to the respective opposite side edges. Each of the channels includes a pair of sidewalls for supporting the lower ends of the support members. In particular, a plurality of fasteners secure each of the lower ends of the support members to the base member. The fasteners extend through a lower end of a respective support member and through each of the sidewalls of the respective U-shaped channels adjacent to the support members.

In addition, the frame may further include a plurality of protective feet which are useful during assembly and shipping but which may be removed by the purchaser. The protective feet have a bolt with a head and a threaded shank cooperably engaged in the feet. A plurality of T-shaped slots are formed in at least one of the sidewalls of the U-shaped channels and a connecting wall between the sidewalls, such that the bolt and the feet can be removably engaged within the channel by passing the bolt head through the T-shaped slot.

A method of assembling an arc welder power source also forms a part of the present invention and includes the steps of adjoining the ends of a first and second pair of support members so as to form two V-shaped side braces defining first and second apices. The apices are transversely aligned with each other and then connected with a cross member so as to define a frame subassembly. A portion of the power circuit, such as the inductor, can be mounted on the frame subassembly. In particular, that portion of the power circuit may be mounted on the cross member of the frame subassembly. The frame subassembly is then attached to the frame of the power source such that the side braces define an inverted V-shaped configuration.

According to another aspect of the invention, a receptacle is provided in the upper wall of the inverted channel of the cross member. A pin for supporting auxiliary welding apparatus, such as a wire feeder, includes a downwardly extending portion which may be removably received within the receptacle. The pin also includes an upwardly extending portion for mounting the auxiliary apparatus thereon. In addition, a lift hook is provided and has a downwardly extending portion which also may be removably received within the receptacle. Thus, advantageously, the lift hook can only be used when the auxiliary welding apparatus is removed which prevents the possibility of the auxiliary welding apparatus falling from the power source when the power source is lifted by the lift hook.

The present invention also includes a busbar assembly for advantageously supporting two rows of capacitors in parallel on the frame of an arc welder power source or the like. The busbar assembly includes a center conductor having a U-shaped configuration and defining a central portion and a pair of side wall portions extending upwardly therefrom. All of the capacitor terminals of one polarity are connected to the center conductor.

The busbar assembly also includes an elongate bridge conductor extending over the center conductor and having a central portion, a pair of sidewalls extending downwardly from the central portion, and a pair of edge portions each extending outwardly from a respective sidewall over a respective row of capacitors. The edge portions are connected to each of the capacitor terminals of the opposite polarity such that all of the capacitors are electrically connected in parallel. The busbar assembly also includes a pair of end support portions defined by the elongate bridge conductor for advantageously supporting the busbar and capacitors on the frame of the arc welder power source.

The central portion of the elongate bridge conductor preferably defines a plurality of openings over the central portion of the center conductor for allowing access to the capacitor terminals connected to the center conductor. In addition, the center conductor and bridge conductor are preferably formed of copper.

The arc welder power source also includes a fan assembly for generating an airstream through the power source. According to the present invention, the fan assembly includes a frame mounted to the power source and which defines at least two opposed recessed portions. A motor is mounted on the frame and a fan blade is operatively connected to the motor for generating the airstream.

A fan shroud is supported on the frame and encloses the fan blade. The shroud has resilient portions which are fitted within the opposed recessed portions of the frame such that the shroud is retained on the frame in a snap fit configuration. In particular, the fan shroud is formed of a resilient material having a generally frusto-conical shape and having a radially outwardly directed peripheral edge. The fan assembly may also include guiding surfaces adjacent to the recessed portions for guiding the peripheral edge into the recessed portions when the peripheral edge is being fitted therein.

A method of assembling a fan assembly also forms a part of the present invention and includes the steps of mounting a motor and fan blade on a frame and positioning a resilient fan shroud adjacent to the fan blade and at least two opposed recessed portions formed in the frame. The resilient fan shroud is then fitted within the opposed recessed portions such that the shroud is supported on the frame and encloses the fan blade. Preferably, the mounting step includes mounting the motor and fan blade on a frame subassembly and then mounting the frame subassembly on the power source frame after the fan shroud fitting step.

BRIEF DESCRIPTION OF THE DRAWINGS

Some of the advantages of the present invention having been stated, others will appear as the description proceeds, when taken in connection with the accompanying drawings, which are not necessarily drawn to scale, and wherein:

FIG. 1 is a perspective view of an arc welder power source according to the present invention;

FIG. 2 is a perspective view of the arc welder power source illustrated with several cover panels removed;

FIG. 6 is an enlarged sectional view of the cross member and upper ends of a pair of support members taken along lines 6—6 of FIG. 1 and illustrating a lift hook;

FIG. 7 is the same view as FIG. 6 but illustrating a pin for supporting auxiliary welding apparatus;

FIG. 8 is a sectional view of a fan assembly according to the present invention;

FIGS. 9 and 10 are enlarged views of FIG. 8 further illustrating the installation of the fan shroud;

FIG. 11 is a perspective view of a bank of capacitors and busbar according to another embodiment of the present invention;

FIG. 12 is an exploded view of FIG. 11 illustrating both conductors of the busbar;

FIGS. 13 and 14 are sectional views taken along lines 13—13 of FIG. 5 illustrating the removal of protective feet of the arc welder power source.

DETAILED DESCRIPTION OF THE PREFERRED EMBODIMENTS

Figure 3:
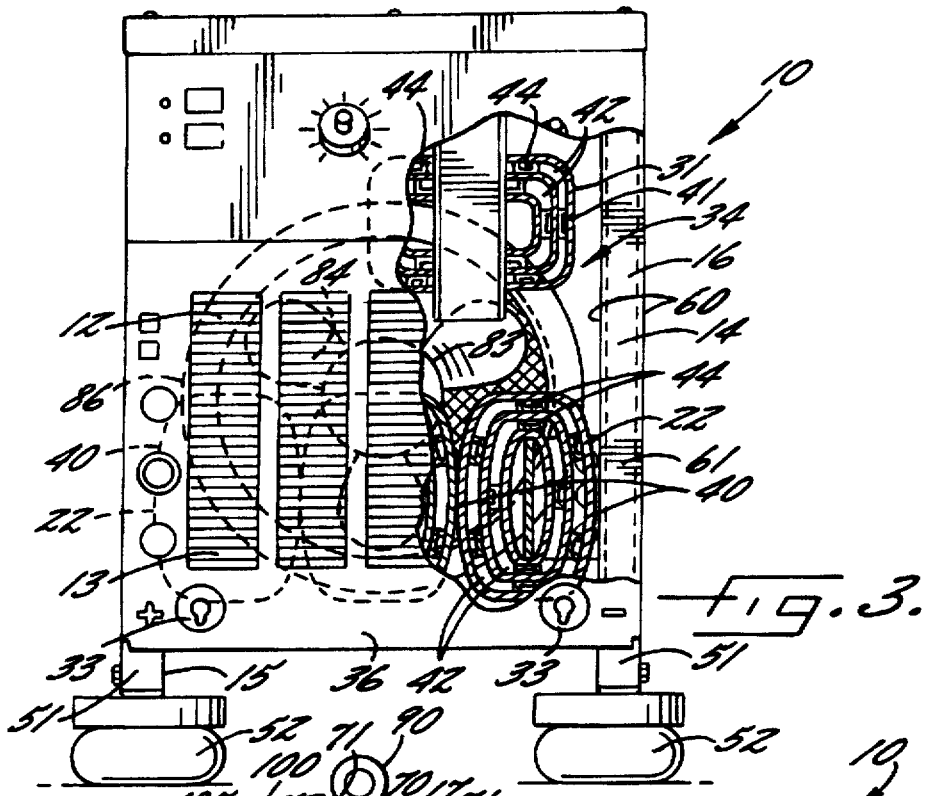
FIG. 3 is a cutaway front view of the arc welder power source illustrating a transformer and an inductor and their orientation relative to a cooling fan.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The arc welder power source 10 according to the present invention is illustrated in FIG. 1. The power source 10 includes several removable cover panels 11 which enclose the various components of the power source. The cover panels 11 may include one or more groups of vents 12 for allowing the intake of air to cool the power source, as discussed in more detail below.

A front cover panel 13 includes a group of intake vents 12 and various switches, controls, instruments, and terminals relating to the power source 10. For example, the front cover panel 13 may include one or more voltmeters or ammeters, which may have a digital display, to inform the operator about the strength of the welding power. The front cover panel 13 may also include several resettable circuit breakers, a voltage output control knob and output terminals 33 for connecting cables to the welding electrodes. Large pushing or pulling forces may be applied to these terminals 33 by the operator when connecting the electrode cables, and accordingly, it is important that the terminals be rigidly mounted to the power source 10.

In FIG. 2, the arc welder power source 10 is illustrated with several of the cover panels 11 removed. The power source 10 includes a frame 14 which includes a base member 15 and four support members 16 arranged in two pairs and defining an inverted V-shaped configuration. A cross member 17 extends between and is connected to the support members 16 to form a substantially rigid frame structure as discussed in more detail below.

Figure 4:
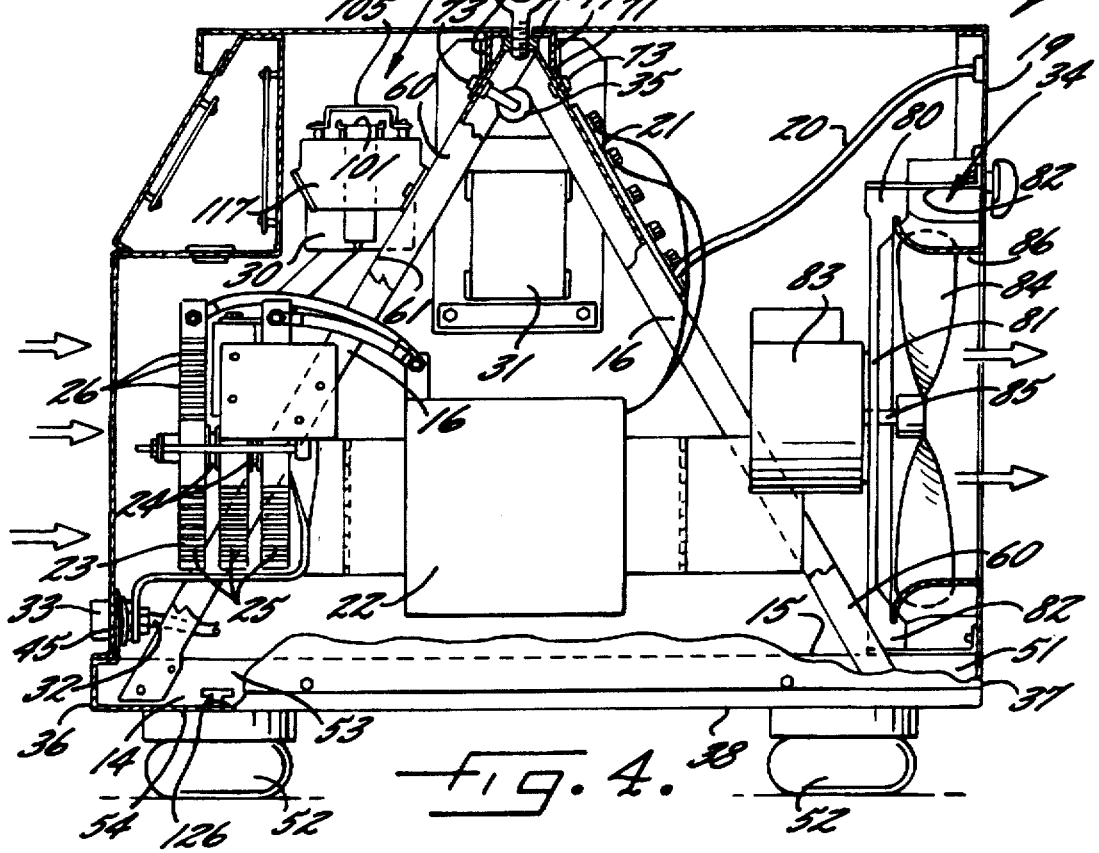
FIG. 4 is a cutaway and sectional view of the arc welder power source taken along lines 4—4 of FIG. 1 illustrating the direction of the airstream therethrough.

The arc welder power source 10 includes a power circuit having various electrical components support on the frame 14 as illustrated in FIG. 4. In particular, the power circuit includes an electrical input line 20 which is connected to a supply of conventional alternating household or industrial current.

The input line 20 is connected to a changeover terminal board 21 which allows for supply currents of various voltages and phase configurations to be used, which is especially useful when the welder power source 10 is used in foreign countries. Various connectors on the changeover terminal board 21 are preconfigured depending on the supply current used to ensure the proper voltage and current at the output side of the power source 10.

The supply current is passed from the changeover terminal board 21 to a transformer 22. The electrical components of the power circuit leading to the transformer 22 are considered to be on the primary side of the transformer, whereas the electrical components downstream of the transformer are considered to be on the secondary side. The transformer 22 transforms the high voltage-low amperage supply current on the primary side to a low voltage-high amperage current on the secondary side, which is more desirable for arc welding operations.

The current from the secondary side of the transformer 22 is then passed to a rectifier 23 where it is converted from alternating current to direct current. As is conventional in the art, the rectifier 23 may include one or more thyristors 24 in operative connection with one or more heat sinks 25. The thyristors 24, which are preferably silicon-controlled rectifiers (SCR), generate large amounts of heat when rectifying the current and direct that heat to the heat sinks 25. As shown, the heat sinks 25 include a piece of heat-conductive metal, such as aluminum, provided with a plurality of vanes 26 which increase the surface area of the heat sink 25 and improve convective heat transfer to the ambient air.

From the rectifier 23, the current is passed to one or more devices for smoothing out the voltage signal. In particular, the current is passed through a bank of capacitors 30 and/or an inductor 31 which create a more uniform direct current. The current may also be passed through a resistor 35 mounted under the cross member 17. The current is then passed to an output line 32 which is connected to one of the output terminals 33 mounted adjacent to the front cover panel 13.

A fan assembly 34 can also be seen in FIG. 4 which generates an airstream through the power source 10 in a generally horizontal direction and which is exhausted through vents 18 in a rear cover panel 19. The airstream helps to cool the rectifier 23 and other components and prevent dangerous overheating which may occur when the arc welder is continuously operated for a large amount of time. A temperature-controlled circuit breaker may also be included to interrupt the power circuit when the temperature exceeds a predetermined limit.

As shown in FIG. 3, the transformer 22 includes three sets of windings 40 which each define a central axis. In addition, the inductor 31 includes a set of windings 41 which also defines a central axis. The windings 40,41 are all aligned in a horizontal direction such that their central axes extend parallel to the direction of the airstream generated by the fan assembly 34. This orientation enhances convective heat transfer from the windings 40,41 and improves cooling. One or more baffles (not shown) may be used to direct the airstream over the windings 40,41.

The windings 40,41 may also include a plurality of openings 42 which extend axially through the windings so as to permit a portion of the airstream generated by the fan assembly 34 to flow therethrough, which further enhances the cooling effect of the airstream. These openings 42 may be maintained by spacers 44 which are inserted in the windings 40,41 as they are being wound. Each of the spacers 44 according to the present invention is preferably a C-shaped channel section formed of a heat conductive metal, such as aluminum. These heat conductive spacers 44 not only maintain the openings 42 but advantageously further enhance convective heat transfer to the passing airstream and improve the efficiency of the fan assembly 34.

Figure 5:
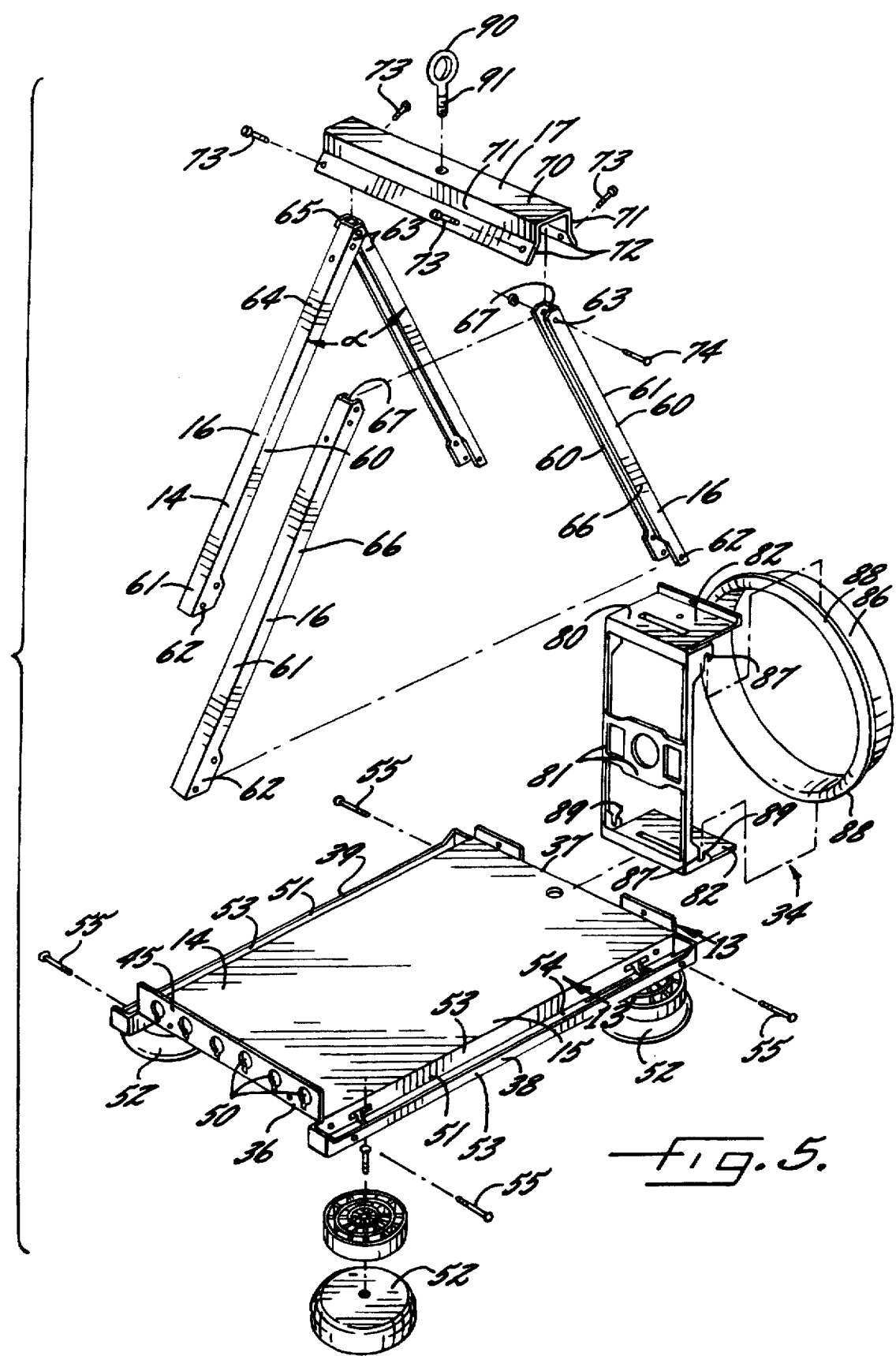
FIG. 5 is an exploded perspective view of two pairs of support members and a cross member of the frame of the arc welder power source.

FIG. 5 illustrates an exploded view of the assembly of the frame 14. The base member 15 includes front 36 and rear 37 edges and opposite side edges 38,39 formed from a single piece of resilient material. For example, the base member 15 may be formed by stamping a piece of sheet steel.

The base member 15 includes an upturned portion 45 integrally formed at the front edge 36 of the base member. The upturned portion 45 is provided with a plurality of openings 50 formed therein which may accommodate the output terminals 33 or other switches, etc. at the front of the power source 10. This is advantageous over prior arc welders wherein the output terminals 33 are mounted to the front cover panel 13, because the base member 15, which will typically have a stronger structure than the front cover panel, provides a more secure mounting for the terminals. As discussed above, the pushing and pulling forces exerted on the output terminals 33 may be large, and thus it is advantageous that the terminal jacks according to the present invention are securely mounted.

A pair of U-shaped channels 51 are also integrally formed in the base member 15. These U-shaped channels 51 strengthen the base and provide mounting surfaces for temporary protective feet 52 which may be attached during assembly, as discussed in more detail below. In addition, the U-shaped channels 51 provide a mounting point for the support members 16. The U-shaped channels 51 each include a pair of integrally formed sidewalls 53 and a connecting wall 54 therebetween. Accordingly, at least one fastener 55, such as a bolt, may advantageously extend through the support member 16 and both of the sidewalls 53 so that the support member is securely mounted to the base member 15. This feature is preferable to prior designs where a support member is secured at only one point to the base member, such as the case when the base member includes only a single flange on each side thereof for securing the support members.

The support members 16 also define U-shaped channels and have a pair of sidewalls 60 and a connecting wall 61 therebetween for connecting the sidewalls and defining the U-shape. The support members 16 each include a lower end 62 and an upper end 63. A first pair 64 of support members 16 is adjoined at the upper ends 63 thereof so as to form an inverted V-shaped side brace defining a first apex 65. A second pair 66 of support members 16 is adjoined at the upper ends 63 thereof so as to also form an inverted V-shaped side brace and to define a second apex 67. The first and second apices 65,67 are transversely aligned and are connected by way of the cross member 17.

The cross member 17 comprises an inverted generally U-shaped channel defining an upper wall 70 and a pair of depending sidewalls 71 which are secured to the upper ends 63 of the respective support members 16 as can be seen in FIGS. 6 and 7. In particular, the connecting walls 61 of each pair of support members 16 face away from each other and the depending sidewalls 71 of the cross member 17 include fastening surfaces 72 which may be fastened in abutting contact with the connecting walls. A fastener 73 such as a bolt extends through the fastening surface 72 of the cross member 17 and the connecting wall 61 of the respective support member 16, thereby forming a secure and stable frame structure.

The connecting walls 61 of the support members 16 define an included angle α which when fastened is preferably greater than 50°, and more preferably between about 500 and 900. In particular, an included angle α of about 60° is preferred so that the support members 16 and the portion of the base member 15 between the lower ends 62 thereof define an equilateral triangle. In addition, the fastening surfaces 72 may be bent outwardly so as to define an included angle corresponding to the angle α defined by the support members 16. Thus, the support members 16 and cross member 17 are easy to assemble without any cutting or bending of the support members.

Just as importantly, however, the cross member 17 allows the support members 16 of each pair 64,66 to be oriented such that the connecting walls 61 face outwardly and away from the other support member of that pair. This feature of the present invention makes it easy to mount various components on the frame 14 and is an important improvement over conventional arc welders where the connecting walls of the support members face each other and any components must be disadvantageously mounted to either the sidewalls or the undersurface of the connecting wall of the support members.

When assembling the power source 10, the lower ends 62 of the support members 16 may be secured to the base member 15 and the upper ends 63 brought together so that the cross member 17 may then be secured thereover. Various electrical components can then be secured to the support members 16 or cross member 17.

Alternatively, however, the support members 16 and cross member 17 may be advantageously combined as a frame subassembly prior to being mounted to the base member 15. Preassembly of the frame subassembly is preferable inasmuch as it makes it easier to affix various components to the subassembly. For example, the frame subassembly can be turned upside down before being mounted on the base member 15 so that the components can be more easily secured to the support members 16 and cross member 17.

In such circumstances, a bolt or pin 74 may be used to temporarily join the upper ends 63 of the support members 16 so as to define the apices 65,67 before attaching the cross member 17 thereto. The apex fastener 74 can be removed after the cross member 17 has been secured to the support members 16.

Also illustrated in FIG. 5 is part of the fan assembly 34 which is secured to the rear edge 37 of the base member 15. The fan assembly 34 includes a fan frame 80 having a center portion 81 and a pair of end portions 82. A rotatable motor 83, such as an electric motor, is secured to the center portion 81 of the fan frame 80 as can be seen in FIGS. 2 and 4, and a fan blade 84 is supported on the shaft 85 of the motor 83. Exhaust vents 18 are formed in the rear cover panel 19 so that warm air is removed from the power source 10. A generally frusto-conical fan shroud 86 surrounds the fan blade 84 to protect users from injury and also to improve the efficiency of the fan assembly 34.

The installation of the fan shroud 86 and the fan frame 80, which also forms a part of the present invention, is illustrated in more detail in FIGS. 8–10. The end portions 82 of the fan frame 80 are preferably provided with at least two opposed radially inwardly directed recessed portions 87. In addition, the fan shroud 86 is preferably formed of a resilient material, such as plastic, which defines a radially outwardly directed peripheral edge 88. When installing the fan shroud 86, the peripheral edge 88 is first placed adjacent to a pair of inwardly directed guiding surfaces 89. As the fan shroud 86 is pressed against the guiding surfaces 89, the peripheral edge 88 is directed radially inward, as illustrated in FIG. 9. With continued pressing, as illustrated in FIG. 10, the peripheral edge 88 snaps over the guiding surfaces 89 and is engaged within the recessed portions 87 in a snap fit configuration. Thus, the fan shroud 86 is advantageously secured to the fan assembly 34 without the need for any fasteners, which makes assembly easier and lowers manufacturing costs. In addition, the fan assembly 34 can preferably be preassembled before mounting the assembly on the base member 15.

Although the fan assembly 34 is illustrated with the recesses 87 formed in the fan frame 80, it would be understood that the same advantages could be achieved with the cooperably engaged male/female structure reversed such that, for example, a radially inwardly directed tab on the fan frame 80 could be received within a slot or groove formed in the shroud 86. Likewise, it would also be understood that the resilient member could be reversed so that the fan frame 80 would be resilient and/or the fan shroud 86 would be substantially rigid.

FIG. 6 illustrates a lift hook 90 used for lifting the power source 10 such as with a crane or the like. The lift hook 90 includes a downwardly extending portion 91 which is removably received within a receptacle 92 secured to the upper wall 70 of the cross member 17. The receptacle 92 may take the form of a threaded nut welded to the underside of the upper wall 70. The inverted channel shape of the cross member 17 provides structural and torsional rigidity to the frame 15 when lifted from the lift hook 90.

Alternatively, a pin 93 having an upwardly extending portion 95 for supporting auxiliary welding apparatus 96 such as a wire feeder or boom may be secured in the receptacle 92 as shown in FIG. 7. The pin 93 may be fitted with a nylon sleeve 97 so as to provide a low friction and insulated outer surface upon which the auxiliary welding apparatus 96 can be rotated. A downwardly extending portion 94 of the pin 93 may be received within the receptacle 92 in the same manner as the downwardly extending portion 91 of the lift hook 90. Accordingly, the lift hook 90 can only be used when the pin 93 and auxiliary welding apparatus 96 has been removed, which advantageously improves the safety of the arc welder because the auxiliary weld apparatus cannot fall from the power source 10 when the power source is lifted by the lift hook 90.

The bank of capacitors 30 used for smoothing the voltage signal of the output current is illustrated in FIGS. 11 and 12. The capacitors 30 are all connected in parallel by way of a busbar assembly 100. The busbar assembly 100 includes a center conductor 101 having a U-shaped configuration and defining a central portion 102 and a pair of sidewall portions 103 extending upwardly therefrom. The central portion 102 of the center conductor 101 is connected to each of the capacitor terminals 104a of one polarity. The center conductor 101 may also include a lead 109 extending downwardly therefrom.

The capacitor terminals of the opposite polarity 104b are all connected to an elongate bridge conductor 105 extending over the center conductor 101. The elongate bridge conductor 105 includes a central portion 106 and a pair of sidewalls 107 extending downwardly from the central portion so as to define a U-shape opposite of that of the center conductor 101. A pair of edge portions 108 extend outwardly from a respective sidewall 107 so as to extend over a respective row of capacitors 30 and the edge portions 108 are electrically connected to each of the capacitor terminals of the opposite polarity 104b. Accordingly, all of the capacitors 30 of both rows are electrically connected in parallel.

The center conductor 101 and bridge conductor 105 are preferably formed of a heat-conductive and electrically conductive material such as copper. A plurality of screws 111 and washers 112 join the respective conductors 101,105 to the terminals 104a,104b of the capacitors 30. In addition, a plurality of circular openings 113 is advantageously provided in the central portion 106 of the bridge conductor 105 so as to provide access to the terminals 104a connected to the center conductor 101.

The elongate bridge conductor 105 also defines a pair of end support portions 116 wherefrom the busbar assembly 100 and capacitors 30 may be supported on the frame 14. In particular, the end support portions 116 may be mounted to a pair of brackets 117, as can be seen in FIG. 4, which are mounted on the outwardly facing connecting walls 61 of the support members 16. Thus, according to the present invention, the busbar assembly 100 is advantageously structurally strong, which is believed to be attributable to the opposed U-shaped conductors 101,105, and additional brackets in the center of the elongate busbar are not needed. The busbar assembly 100 performs both structural and electrical functions which desirably reduce assembly and manufacturing costs.

The temporary protective feet 52 are shown in more detail in FIGS. 13 and 14 and are used during assembly and shipping to protect the bottom of the power source 10 and to space the power source from any adjacent vertical walls or other power supplies. The temporary protective 52 feet include a base portion 120 and a spacer portion 121. A nut 122 is fixed in the base portion 120. A bolt 123 extends through each foot 52 and includes a head 124 and a threaded shank 125 cooperably engaged in the nut 122.

A plurality of T-shaped slots 126 are formed in at least one of the sidewalls 53 and the connecting wall 54 of the U-shaped channels so that the feet 52 can be removed by the purchaser of the arc welder. The feet 52 are unscrewed so that the bolt head 124 can fit through the T-shaped slot 126 and the feet can be removed. The T-shaped slots 126 may then be used by the purchaser to secure the power source 10 to a mounting surface.

In the drawings and specifications, preferred embodiments of the invention have been illustrated and described, and although specific terms are employed, they are used in a generic and descriptive sense and not for purposes of limitation.

That which is claimed:

1. A power source apparatus for supplying electrical power for an arc welder or the like and comprising:

a frame comprising;

a generally rectangular base member which defines front and rear edges and opposite side edges, a first pair of support members each having a lower end and an upper end, wherein said lower ends are mounted adjacent to one of said side edges of said base member in a spaced apart relation, and wherein said upper ends are positioned adjacent each other so as to define an inverted V-shaped configuration;

a second pair of support members each having a lower end and an upper end, wherein said lower ends of said second pair are mounted adjacent to the other of said side edges of said base member in a spaced apart relation, and wherein said upper ends of said second pair are positioned adjacent each other so as to define an inverted V-shaped configuration; and a cross member extending transversely between the respective upper ends of said first and second pairs of support members, said cross member comprising an inverted channel defining an upper wall and a pair of depending sidewalls secured to the respective upper ends of each of said support members; and a power circuit supported on said frame and comprising an electrical input line, a transformer having a primary side connected to said input line and a secondary side, at least one rectifier connected to said secondary side of said transformer, and an output line connected to said one rectifier.

2. A power source apparatus as defined in claim 1 wherein each of said support members of said frame further comprises a U-shaped channel defining a pair of sidewalls and a connecting wall therebetween, and further wherein said connecting walls of at least one of said pairs of support members face away from each other.

3. A power source apparatus as defined in claim 2 wherein said connecting walls of said pair of support members define an included angle and wherein said depending sidewalls of said cross member include fastening surfaces defining an included angle corresponding to that defined by said support members.

4. A power source apparatus as defined in claim 1 further comprising a cooling fan mounted adjacent to one of said front and rear edges of said base member for generating an airstream through said apparatus which is directed around said one rectifier and said transformer.

5. A power source apparatus as defined in claim 4 wherein said transformer includes at least one set of windings which defines a central axis, and wherein said power circuit further comprises at least one inductor which comprises at least one set of windings which defines a central axis, and wherein said transformer and said inductor are mounted so that the central axes thereof are horizontally disposed and extend parallel to the direction of the airstream generated by said cooling fan.

6. A power source apparatus as defined in claim 5 wherein said at least one set of windings of said transformer and said at least one set of windings of said at least one inductor each define a plurality of openings extending axially therethrough and so as to permit a portion of the airstream generated by said cooling fan to flow therethrough.

7. A power source apparatus as defined in claim 6 wherein said openings in said transformer and inductor are maintained by a spacer disposed within each of said openings, said spacer comprising a C-shaped channel section formed of a heat-conductive metal.

8. A power source apparatus as defined in claim 1 wherein said power circuit further comprises an elongate resistor secured to an underside of said inverted channel cross member.

9. A frame for an arc welder power source or the like, said frame comprising:

a base member defining opposite side edges;

a first pair of support members each having a lower end and an upper end, wherein said lower ends are mounted adjacent to one of said side edges of said base member in a spaced apart relation, and wherein said upper ends are positioned adjacent each other so as to define an inverted V-shaped configuration;

a second pair of support members each having a lower end and an upper end, wherein said lower ends of said second pair are mounted adjacent to the other of said side edges of said base member in a spaced apart relation, and wherein said upper ends of said second pair are positioned adjacent each other so as to define an inverted V-shaped configuration; and a cross member extending transversely between the respective upper ends of said first and second pairs of support members, said cross member comprising an inverted channel defining an upper wall and a pair of depending sidewalls secured to the respective upper ends of each of said support members so as to form a substantially rigid frame structure supported on said base member.

10. A frame as defined in claim 9 wherein each of said support members further comprises a U-shaped channel defining a pair of sidewalls and a connecting wall therebetween, and further wherein said connecting walls of at least one of said pairs of support members face away from each other.

11. A frame as defined in claim 10 wherein said connecting walls of said pair of support members define an included angle and wherein said depending sidewalls of said cross member include fastening surfaces defining an included angle corresponding to that defined by said support members.

12. A frame as defined in claim 11 further comprising at least one fastener extending through said fastening surfaces of said cross member and said connecting wall of said support members.

13. A frame as defined in claim 9 wherein said base member further comprises an upturned portion integrally formed with a front edge of said base member.

14. A frame as defined in claim 9 wherein said base member further comprises a pair of integrally formed U-shaped channels, each of said channels having a pair of sidewalls and being positioned adjacent to a respective opposite side edge for supporting said lower ends of said support members.

15. A frame as defined in claim 14 further comprising a plurality of fasteners for securing each of said lower ends of said support members to said base member, said fasteners extending through a lower end of a respective support member and through each of said sidewalls of a respective U-shaped channel adjacent to said support members.

16. A frame for an arc welder power source or the like, said frame comprising:

a generally rectangular base member defining opposite side edges;

a pair of U-shaped channels formed in said base member, each of said channels being adjacent a respective opposite side edge and having a pair of integrally formed sidewalls;

a first pair of support members each having a lower end and an upper end, wherein said lower ends are mounted in one of said channels in a spaced apart relation, and wherein said upper ends are positioned adjacent each other so as to define an inverted V-shaped configuration;

a second pair of support members each having a lower end and an upper end, wherein said lower ends of said second pair are mounted in the other of said channels in a spaced apart relation, and wherein said upper ends of said second pair are positioned adjacent each other so as to define an inverted V-shaped configuration; and a cross member extending transversely between and connected to the respective upper ends of said first and second pairs of support member so as to form a substantially rigid frame structure supported on said base member.

17. A frame as defined in claim 16 further comprising a plurality of fasteners for securing each of said lower ends of said support members to said base member, said fasteners extending through a lower end of a respective support member and through each of said sidewalls of a respective U-shaped channel adjacent to said support member.

18. A frame as defined in claim 16 wherein said U-shaped channels further comprise a connecting wall between said integrally formed sidewalls, and wherein said frame further comprises:

a plurality of protective feet;

a bolt having a head and a threaded shank cooperably engaged in each of said feet; and a plurality of T-shaped slots defined by at least one of said sidewalls and said connecting wall of said U-shaped channels, such that said bolt can be removably engaged within said channel by passing said bolt head through said T-shaped slot.

19. A frame as defined in claim 16 wherein said base member further comprises an upturned portion integrally formed with a front edge of said base member.

20. A power source apparatus for supplying electrical power for an arc welder or the like and comprising:

a frame comprising;
   a base member defining opposite side edges;
   a first pair of support members each having a lower end and an upper end, wherein said lower ends are mounted adjacent to one of said side edges of said base member in a spaced apart relation, and wherein said upper ends are positioned adjacent each other so as to define an included angle between said first pair of support members greater than 50°;
   a second pair of support members each having a lower end and an upper end, wherein said lower ends of said second pair are mounted adjacent to the other of said side edges of said base member in a spaced apart relation, and wherein said upper ends of said second pair are positioned adjacent each other so as to define an included angle between said second pair of support members greater than 50°; and
   a cross member extending transversely between and connected to the respective upper ends of said first and second pairs of support members; and a power circuit supported on said frame and comprising an electrical input line, a transformer having a primary side connected to said input line and a secondary side, a rectifier connected to said secondary side of said transformer, and an output line connected to said rectifier, wherein at least a portion of said power circuit is suspended from said cross member of said frame.

21. A power source apparatus as defined in claim 20 wherein said included angles of said first and second pairs of support members are the same and are between about 50° and 90°.

22. A power source apparatus as defined in claim 21 wherein said included angles are about 60°.

23. A power source apparatus as defined in claim 20 wherein said portion of said power circuit suspended from said cross member comprises at least one inductor.

24. A method of assembling an arc welder power source having a frame and a power circuit, said method comprising the steps of:

adjoining the ends of a first pair of support members so as to form a V-shaped side brace defining a first apex;

adjoining the ends of a second pair of support members so as to form a V-shaped side brace defining a second apex;

mounting at least a portion of the power circuit on at least one of the side braces;

transversely aligning the first and second apices and connecting them with a cross member so as to define a frame subassembly; and then attaching the frame subassembly to the frame of the power source such that the side braces define an inverted V-shaped configuration.

25. A method as defined in claim 24 wherein said mounting step further comprises mounting at least one inductor on the one side brace.

26. A method as defined in claim 24 wherein said mounting step further comprises mounting at least a portion of the power circuit on the cross member of the frame subassembly.

27. An arc welder capable of supporting auxiliary welding apparatus, said welder comprising:

a frame comprising;

a generally rectangular base defining opposite side edges;

a pair of side braces each connected to respective ones of said side edges of said base and each defining an upper end;

a cross member extending transversely between the respective upper ends of said pair of side braces, said cross member comprising an inverted channel defining an upper wall and a pair of depending sidewalls secured to the respective upper ends of said side braces, said upper wall comprising a receptacle;

a power circuit supported on said frame and comprising an electrical input line, a transformer having a primary side connected to said input line and a secondary side, a rectifier connected to said secondary side of said transformer, and an output line connected to said rectifier; and a pin for supporting said auxiliary welding apparatus, said pin comprising a downwardly extending portion for being removably received within said receptacle and an upwardly extending portion for mounting said auxiliary apparatus.

28. An arc welder as defined in claim 27 further comprising a lift hook comprising a downwardly extending portion for being removably received within said receptacle when said pin is removed such that said arc welder can only be lifted with said lift hook when said auxiliary apparatus is removed.

29. An arc welder as defined in claim 27 wherein said upwardly extending portion of said pin further comprises a low friction outer surface such that said auxiliary apparatus can be rotated thereon.

30. An arc welder as defined in claim 29 wherein said low friction outer surface is formed of nylon.

31. An arc welder as defined in claim 28 wherein said receptacle and downwardly extending portion of said pin are provided with corresponding threads.

32. A busbar assembly for supporting two rows of capacitors in parallel on the frame of an arc welder power source or the like, each of the capacitors having a pair of terminals with opposite polarities, said busbar comprising:

a center conductor having a U-shaped configuration and defining a central portion and a pair of sidewall portions extending upwardly therefrom, said center conductor connected to each of the capacitor terminals of one polarity;

an elongate bridge conductor extending over said center conductor and having a central portion, a pair of sidewalls extending downwardly from said central portion, and a pair of edge portions each extending outwardly from a respective sidewall over a respective row of capacitors, said edge portions being connected to each of the capacitor terminals of the opposite polarity of a respective row of capacitors, such that all of the capacitors are electrically connected in parallel; and a pair of end support portions defined by said elongate bridge conductor and adjacent the ends thereof for supporting said busbar assembly and capacitors on the frame of the arc welder power source.

33. A busbar assembly as defined in claim 32 wherein said central portion of said bridge conductor defines a plurality of openings over said central portion of said center conductor for allowing access to the capacitor terminals connected to said center conductor.

34. A busbar assembly as defined in claim 32 wherein said center conductor and said bridge conductor are formed of copper.

35. A power source apparatus for supplying electrical power for an arc welder or the like comprising:

a frame comprising;

a base member defining opposite side edges;

a first pair of support members each having a lower end and an upper end, wherein said lower ends are mounted adjacent to one of said side edges of said base member in a spaced apart relation, and wherein said upper ends are positioned adjacent each other so as to define an inverted V-shaped configuration;

a second pair of support members each having a lower end and an upper end, wherein said lower ends of said second pair are mounted adjacent to the other of said side edges of said base member in a spaced apart relation, and wherein said upper ends of said second pair are positioned adjacent each other so as to define an inverted V-shaped configuration; and a cross member extending transversely between and connected to the respective upper ends of said first and second pairs of support members;

a power circuit supported on said frame and comprising an electrical input line, a transformer having a primary side connected to said input line and a secondary side, a rectifier comprising a plurality of capacitors connected to said secondary side of said transformer, and an output line connected to said rectifier; and a busbar assembly for supporting said capacitors in two adjacent rows, said busbar assembly having a pair of opposed end support portions each being mounted on a respective support member of said first and second pairs of support members.

36. A fan assembly for generating an airstream through the power source of an arc welder or the like, said fan assembly comprising:

a frame adapted to be mounted to the power source and defining a first pair of radially directed engagement portions;

a motor mounted on said frame;

a fan blade operatively connected to and rotated by said motor for generating the airstream; and an annular fan shroud supported on said frame and enclosing said fan blade so as to be coaxially disposed about the axis of rotation of the fan, said shroud defining a second pair of radially directed engagement portions cooperably engaged with said first pair wherein at least one of said pairs of engagement portions is radially resilient such that said shroud is retained on said frame in a snap-fit configuration.

37. A fan assembly as defined in claim 36 wherein said fan shroud is formed of a resilient material having a generally frusto-conical shape and a radially outwardly directed peripheral edge defining said second pair of radially directed engagement portions.

38. A fan assembly as defined in claim 37 wherein said first pair of radially directed engagement portions define opposed recesses and wherein said frame further defines guiding surfaces adjacent to said recesses for guiding said peripheral edge into said recesses when said peripheral edge is being fitted therein.

39. A method of assembling a fan assembly for generating an airstream through a frame of an arc welder power source or the like comprising the steps of:

mounting a motor and fan blade on the frame;

positioning a resilient fan shroud adjacent to the fan blade and at least two opposed recessed portions formed in the frame; and fitting the resilient fan shroud within the opposed recessed portions such that the shroud is supported on the frame and encloses the fan blade.

40. A method of assembling a fan assembly as defined in claim 39 wherein said mounting step further comprises mounting the motor and fan blade on a frame subassembly and then mounting the frame subassembly on the frame after said fan shroud fitting step.

41. A method of assembling a fan assembly as defined in claim 39 wherein said positioning step further comprises positioning said fan shroud adjacent to a plurality of guiding surfaces defined by the frame adjacent to the recessed portions, and wherein said fitting step further comprises pressing the resilient fan shroud against the guiding surfaces until the fan shroud snaps over the guiding surfaces and into the recessed portions.

* * * * *